(No Model.) 2 Sheets—Sheet 1.
W. F. DIAL.
ROTARY SHUTTLE MECHANISM FOR SEWING MACHINES.
No. 304,709. Patented Sept. 9, 1884.
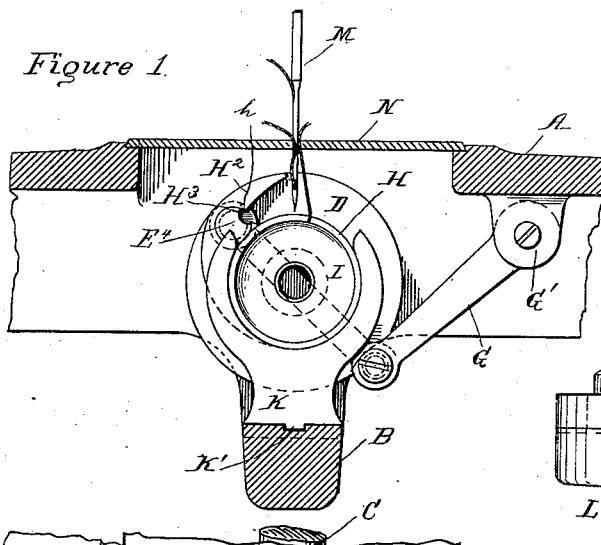
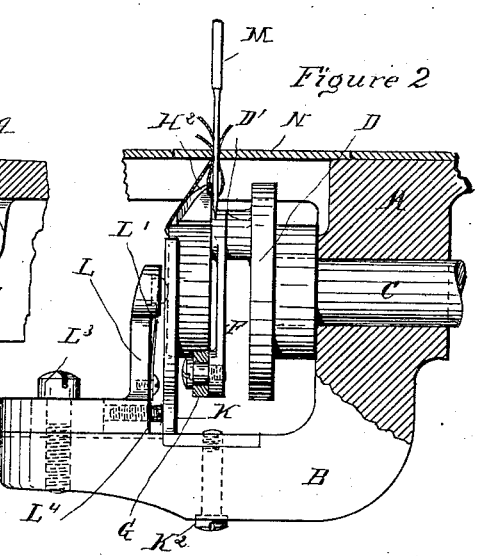
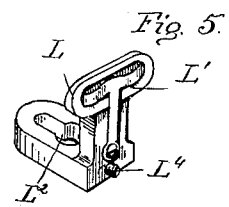
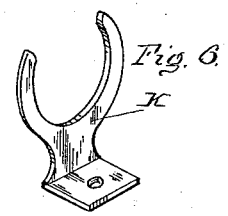
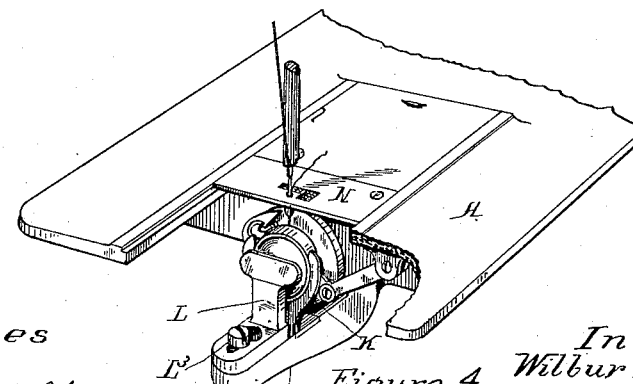
Witnesses
Wm A Jones
A. B. Fairchild
Inventor
Wilbur F. Dial
By Atty
A. M. Wooster

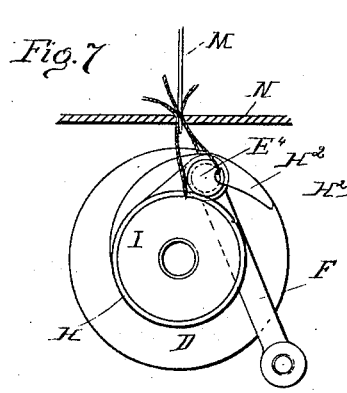
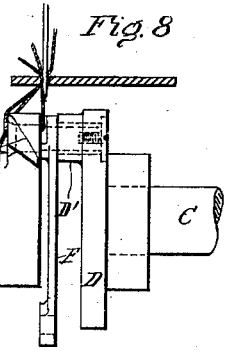
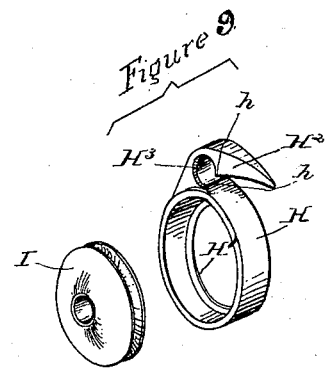
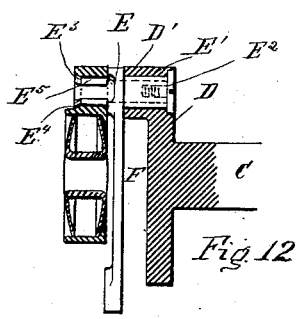
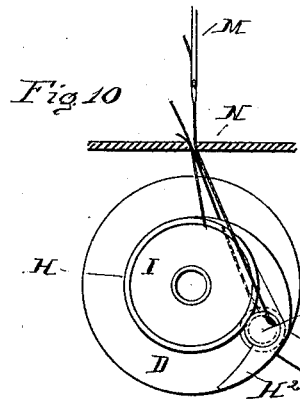
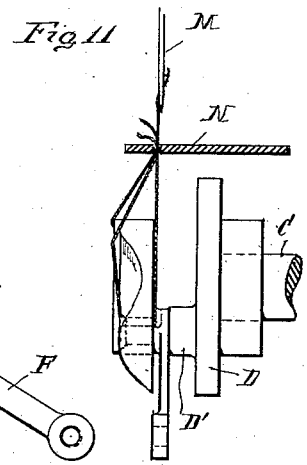
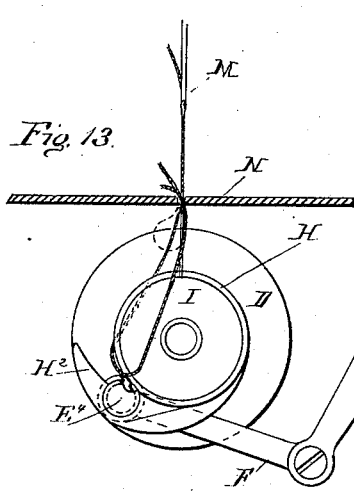
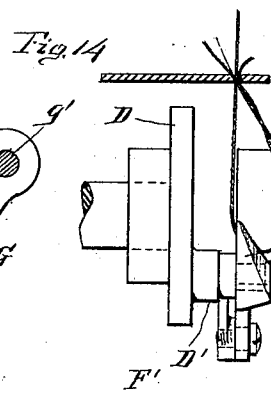
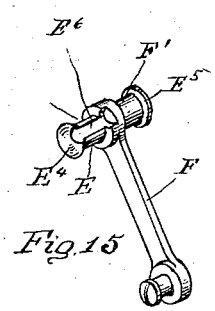
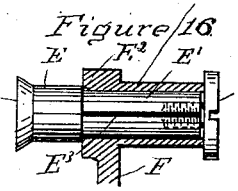

UNITED STATES PATENT OFFICE.

WILBUR F. DIAL, OF BRIDGEPORT, CONNECTICUT.

ROTARY-SHUTTLE MECHANISM FOR SEWING-MACHINES.

SPECIFICATION forming part of Letters Patent No. 304,709, dated September 9, 1884.

Application filed January 23, 1884. (No model.)

*To all whom it may concern:*

Be it known that I, WILBUR F. DIAL, a citizen of the United States, residing at Bridgeport, in the county of Fairfield and State of Connecticut, have invented certain new and useful Improvements in Rotary-Shuttle Mechanism for Sewing-Machines; and I do hereby declare the following to be a full, clear, and exact description of the invention, such as will enable others skilled in the art to which it appertains to make and use the same.

My invention has for its object to simplify the construction of lock-stitch sewing-machines, and with this object in view I have devised a novel construction in which a rotating shuttle passes through the loop in the needle-thread in the formation of each stitch.

My invention consists in the construction and combination of parts, as hereinafter fully described, and then pointed out in the claims.

In order that others may understand my invention, I will proceed to describe the same, referring by letters to the accompanying drawings, forming part of this specification, in which—

Figure 1 is an end elevation with the sliding arm removed and the bracket in section, the shuttle being in position to take the loop. Fig. 2 is a side elevation, Fig. 3 a plan view, and Fig. 4 a perspective, with the parts in the same position. Fig. 5 is a perspective of the sliding arm and spring for holding the shuttle; Fig. 6, a perspective of the yoke which supports the shuttle. Fig. 7 is an end and Fig. 8 a side elevation of the shuttle and its operating mechanism after the taking of the loop. Fig. 9 is a perspective of the shuttle and bobbin detached. Fig. 10 is an end and Fig. 11 a side elevation of the shuttle and its operating mechanism, with the shuttle farther advanced than in Figs. 7 and 8. Fig. 12 is a section of the carrying-plate, the shuttle, and the bobbin, with the stud and link in full lines, the feed-cam being removed. Fig. 13 is an end and Fig. 14 a reversed side elevation of the shuttle and operating mechanism after the loop has escaped from the recess and the take-up is acting to draw it up, the needle-thread being shown in full and dotted lines in Fig. 13. Fig. 15 is a perspective of the link and stud, and Fig. 16 shows the stud with the link and sleeve in section.

Similar letters indicate like parts in all the figures.

A is the bed-plate of the machine; B, a bracket cast with or secured to the bed-plate, and C the shaft journaled near its outer end in the bracket. At the outer end of the shaft is rigidly secured a carrying plate or disk, D, which is preferably provided with a sleeve, D', at its outer edge, in which the sleeve of link F is journaled.

E is the shuttle-stud, which is reduced at its inner end, as at E', leaving a shoulder, $E^2$. The reduced portion of the stud fits into the sleeve F' of the link, and is provided with a groove, $E^3$, which is engaged by a spline (not shown) upon the sleeve, thus holding the stud against rotation therein.

$E^4$ is a head upon the stud, which holds the shuttle in place.

$E^5$ is a screw engaging an internal thread in the end of the stud, which holds the sleeve thereon. The sleeve is made slightly longer than the reduced portion of the stud, so that the screw, when tightened up, will crowd the sleeve against shoulder $E^2$, thus holding the sleeve and stud rigidly together. It will thus be seen that the sleeve and stud move as one piece, being journaled, as stated above, in plate D. (See Figs. 8 and 16.)

$E^6$ is a shallow groove or cut-away portion in the stud, which also extends into the link in which the thread lies during the passage of the shuttle through the loop, as will be more fully explained. The outer end of link F is pivoted to a link, G, which in turn is pivoted to the bed-plate, as at G'.

H is the shuttle, consisting of a ring having an internal shoulder, H', against which the bobbin I rests, and a hook, $H^2$, which engages the loop in the needle-thread. This hook is provided with a recess, $H^3$, contracted at its opening, as at *h*, so that when placed on the stud the shuttle cannot escape therefrom. The hook portion of the shuttle is not made as wide as the ring, (see Figs. 1, 2, and 9,) which permits the outer edge of the ring to rest in a yoke, K, which holds the shuttle against centrifugal action, so that the hook will always be in position to take the loop, and the strain and friction upon the stud is reduced to the minimum. The yoke is preferably provided with a spline, K', engaging with a groove in the bracket, to which the yoke is secured by a screw, K². (See Fig. 2.)

L is a sliding arm having a spring, L'. This arm is provided with a slot, L², and is secured to the bracket by a screw, L³, which passes through the slot, thus permitting the arm to slide when the screw is loosened. The spring L' presses against the bobbin and performs a threefold function—viz., to hold the bobbin in the shuttle, to hold the shuttle against endwise movement, and by pressure against the bobbin to furnish tension for the shuttle-thread.

L⁴ is a screw engaging a thread in the base of the sliding arm. The head of this screw projects outward and abuts against the yoke. By turning this screw in or out I am enabled to regulate the degree of pressure of spring L' against the bobbin—i. e., the tension of the shuttle-thread.

M is the needle, N the cloth-plate, and O the feed-cam, the feed mechanism, however, being omitted, as it forms no part of my present invention.

It will be observed in the drawings that the rotating shuttle is placed outside of the needle, which in its descent passes between the shuttle and the link. It will of course be apparent that, as the loop in the needle-thread must be formed on the outer side of the needle, the needle is set with the long groove on the inner side, and is consequently threaded from the inner side outward. I have shown no take-up for the needle-thread, as it forms no part of my present invention. It should be understood, however, that a take-up of ordinary construction is used.

The operation is as follows: The bobbin is so placed in the shuttle that the thread will unwind in a direction opposite to the rotation of the shuttle, the end of the thread hanging over the edge, but no threading up whatever being required. The shuttle is then placed over the stud, with its base resting in the yoke, and the sliding arm is moved to the right until the head of the screw L⁴ comes in contact with the yoke. Screw L³ is then tightened up, and acts to hold the arm, and with it the shuttle and bobbin, in operative position. Figs. 1, 2, and 4 show the parts in position to commence the formation of a stitch. In Fig. 7 the loop in the needle-thread has been taken, and is lying in the groove in the stud—that is to say, between the stud and the wall of the recess in the shuttle—the size of the groove being such that there is no friction or tendency to retard the thread while it is held between the shuttle and the stud. In Figs. 10 and 11 the movement of the shuttle is shown as farther advanced. It will be observed that although the shuttle has made nearly half a revolution the position of the recess in the stud relatively to the plane of the cloth-plate has changed very slightly, nor does it change materially during the revolution of the shuttle. This is owing to the stud and link F moving as one piece and the thrust of this link being taken up by the pivoted link G, to which the link F is pivoted. It will be seen that neither end of the link F has a fixed support, one end being pivoted to the rotary carrying-plate and the other to pivoted link G, which simply carries that end, taking up the thrust caused by the rotation of the disk, and thus substantially maintaining the slot in the stud in the plane of the cloth-plate.

In Figs. 13 and 14 the rotation of the shuttle has proceeded until the stud has been carried more than half around the center of rotation. By this time the position of the recess in the shuttle relatively to the groove or cut-away portion of the stud has changed, so that the loop of the needle-thread, having passed around the recess, (during which time the entire shuttle has passed through the loop,) may now escape from the recess and be drawn up by the take-up, which begins to act at the instant the loop is free to escape from the recess. (See full and dotted lines in Fig. 13.) Before the shuttle can reach the position shown in Fig. 1 the loop has been drawn up tightly, and the parts are then in position to proceed with the formation of another stitch.

I do not desire to limit myself to the exact details of construction shown, as they may be varied within reasonable limits without departing from the spirit of my invention. I do not, however, desire to claim in this application matter covered by the claims in my applications, Serial Nos. 118,401, 118,403, and 118,404, filed January 23, 1884, or in my application, Serial No. 128,395, filed April 18, 1884.

I claim—

1. The combination, with the needle, of a rotary shuttle carried by a stud having a groove which permits the needle-thread to pass between the shuttle and the stud in the formation of each stitch, and means for holding the shuttle against centrifugal action.

2. The combined link, sleeve, and stud, in combination with the carrying-plate in which the sleeve is journaled, the shuttle which is carried by the stud, and means for holding the shuttle against centrifugal action, substantially as described.

3. In a sewing-machine, a shuttle having a hook and recess, as described, in combination with a stud engaging the recess, and operating mechanism which imparts rotary motion to the shuttle through the stud, said stud being at the same time free to move independently of the shuttle and the operating mechanism.

4. In a sewing-machine, a disk at the end of the shaft, having a sleeve at its edge, and a combined link and stud journaled in the sleeve, in combination with a shuttle carried by the stud, and means for holding the shuttle against centrifugal action.

5. The disk, the stud journaled therein, and the link connected to the stud, in combination with the shuttle carried by the stud, a yoke which supports the shuttle, and a spring carried by a sliding arm, as described, and for the purpose set forth.

6. The stud having a groove or cut-away portion, as shown, and the link F, connected therewith, in combination with the carrying-disk, the shuttle, and a link, G, pivoted to link F and to the bed-plate, whereby rotary motion is imparted to the shuttle without corresponding rotation of the stud, thus permitting the needle-thread to lie in the groove while the shuttle is passing around it and through the loop.

7. In a sewing-machine, the combination, with the shuttle-carrying disk and the yoke, of a sliding arm secured by a set-screw and having a spring, L', and screw $L^4$, as described, and for the purpose set forth.

8. An operating-disk upon the shaft, a shuttle having a recess, $H^3$, with a contracted opening, $h$, and a stud having screw, $E^5$, head $E^4$, and groove $E^6$, in combination with link F, secured at one end to the stud, and having means—for example, link G—at its other end to maintain the plane of the groove as the stud is carried around.

9. The combination of a needle, and a rotary shuttle carried by a stud having a groove for the needle-thread, with a disk on the main shaft, in which the stud is journaled, a yoke which holds the shuttle against centrifugal action, and means—for example, links F and G—for connecting the stud with the bed of the machine, whereby as the stud is carried around the plane of the groove remains substantially unchanged.

10. The combination, with the needle, the shuttle, and the carrying-disk, of a link having a sleeve journaled in said disk, a stud which carries the shuttle, a screw engaging said stud to hold the shuttle, and means—for example, link G—for supporting and guiding the end of the link, which at the same time permits endwise movement.

In testimony whereof I affix my signature in presence of two witnesses.

WILBUR F. DIAL.

Witnesses:
  A. M. WOOSTER,
  A. B. FAIRCHILD.